US010929461B2

(12) United States Patent
Marriott et al.

(10) Patent No.: US 10,929,461 B2
(45) Date of Patent: Feb. 23, 2021

(54) AUTOMATIC DETECTION AND TRANSFER OF RELEVANT IMAGE DATA TO CONTENT COLLECTIONS

(71) Applicant: EVERNOTE CORPORATION, Redwood City, CA (US)

(72) Inventors: Dylan Marriott, Wallisellen (CH); Daniel Nicolae, Berlin (DE); Ruben Bakker, Sursee (CH); Alexander Pashintsev, Cupertino, CA (US); Zdzislaw Pawel Losvik, Stafa (CH); Eugene Livshitz, San Mateo, CA (US); Vitaly Glazkov, Moscow (RU); Boris Gorbatov, Sunnyvale, CA (US); Ilya Buryak, Moscow (RU)

(73) Assignee: EVERNOTE CORPORATION, Redwood City, CA (US)

( * ) Notice: Subject to any disclaimer, the term of this patent is extended or adjusted under 35 U.S.C. 154(b) by 340 days.

(21) Appl. No.: 15/658,361

(22) Filed: Jul. 24, 2017

(65) Prior Publication Data

US 2018/0025003 A1     Jan. 25, 2018

Related U.S. Application Data

(60) Provisional application No. 62/366,222, filed on Jul. 25, 2016.

(51) Int. Cl.
*G06F 16/51*         (2019.01)
*G06F 16/58*         (2019.01)
(Continued)

(52) U.S. Cl.
CPC ............. *G06F 16/51* (2019.01); *G06F 16/55* (2019.01); *G06F 16/5846* (2019.01); *G06F 16/5866* (2019.01)

(58) Field of Classification Search
USPC ....................................................... 707/740
See application file for complete search history.

(56) References Cited

U.S. PATENT DOCUMENTS

| 9,015,301 | B2 * | 4/2015 | Redlich ................. G06Q 10/10 |
| | | | 709/223 |
| 9,317,515 | B2 * | 4/2016 | Arrouye ................ G06F 16/134 |
| | | (Continued) | |

FOREIGN PATENT DOCUMENTS

EP       2704028 A1     3/2014

OTHER PUBLICATIONS

Evernote Corporation, Extended European Search Report, EP17183036.7, dated Oct. 26, 2017, 11 pgs.
(Continued)

*Primary Examiner* — Tamara T Kyle
*Assistant Examiner* — Raheem Hoffler
(74) *Attorney, Agent, or Firm* — Morgan, Lewis & Bockius LLP

(57) ABSTRACT

This application is directed to a method for automatically identifying and transferring relevant image data implemented at a server with a processor and memory including one or programs executable by the processor. The server obtains content items from a personal content collection of a user, analyzes the content items to identify attributes associated with the images, generates rule sets based on the identified attributes, applies the generated rule sets to a plurality of unclassified images, identifies a first set of one or more of the unclassified images, associates each image of the first set with the content items and stores the first set in the personal content collection. A second set of unclassified images is placed in a candidate list to be periodically, without user intervention, monitored and updated for storing
(Continued)

identifying and transferring relevant images in the personal content collection. The generated rule sets are updated after images are stored in the content collection.

18 Claims, 8 Drawing Sheets

(51) Int. Cl.
  *G06F 16/55* (2019.01)
  *G06F 16/583* (2019.01)

(56) References Cited

U.S. PATENT DOCUMENTS

| | | |
|---|---|---|
| 9,336,241 B2 | 5/2016 | Bluvband et al. |
| 9,384,241 B2 * | 7/2016 | Wang ................ G06F 16/24578 |
| 2008/0162602 A1 | 7/2008 | Ashutosh et al. |
| 2008/0192129 A1 * | 8/2008 | Walker ................ G11B 27/034 348/231.2 |
| 2009/0083237 A1 * | 3/2009 | Gelfand ................... G06F 16/58 |
| 2013/0051670 A1 | 2/2013 | Madirakshi et al. |
| 2016/0283483 A1 * | 9/2016 | Jiang .................... G06F 16/248 |
| 2017/0270970 A1 * | 9/2017 | Ho ...................... G06K 9/00288 |
| 2018/0011854 A1 * | 1/2018 | Yi .......................... G06N 20/00 |
| 2018/0018535 A1 * | 1/2018 | Li ............................ G06N 3/08 |

OTHER PUBLICATIONS

Evernote Corporation, Communication Pursuant to Article 94(3), EP17183036.7, dated Jan. 28, 2019, 11 pgs.

* cited by examiner

FIG 1. Identifying and transferring relevant images

FIG. 2. Relevance conditions and rules

FIG. 3. System flow diagram

AUTOMATIC DETECTION AND TRANSFER OF RELEVANT IMAGE DATA TO CONTENT COLLECTIONS

RELATED APPLICATIONS

This application claims priority to U.S. Provisional Patent Application Ser. No. 62/366,222, filed Jul. 25, 2016, titled "Automatic Detection and Transfer of Relevant Image Data to Content Collections," which is hereby incorporated by reference in its entirety.

BACKGROUND

The arrival of multi-platform content management systems, such as the Evernote service and software developed by Evernote Corporation of Redwood City, Calif., aimed at capturing, storing, displaying and modifying all types and formats of content across multiple user devices and platforms, has facilitated and stimulated taking photographs of typed and handwritten text, documents, forms, checks, charts, drawings, whiteboards, along with other categories and formats of visual content, using smartphone cameras. Manual identification, categorization and selective addition of recently captured photographs to content collections, following user's organizational patterns and activities takes progressively more effort as the size of content collection, the diversification of images and the set of organizational workflows simultaneously increase.

SUMMARY

In accordance with one aspect of this application, a method for automatically identifying and transferring relevant image data is implemented at a server with a processor and memory including one or more programs executable by the processor. The method includes dynamically analyzing features and organization of image data and accompanying text data in a personal or shared content collection and building and/or generating a set of image categories, conditions and rules under which a new image is considered relevant to the content collection. The method further includes scanning or analyzing a set of captured images, such as a gallery of photographs captured by a smartphone camera and residing in the smartphone memory that have not yet been classified, recognizing and categorizing images from the gallery, and checking their relevance to the content collection based on the generated image categories, conditions and rules. In some implementations, images satisfying the conditions and rules with a high degree of relevance are automatically transferred (copied, moved, or stored) to the user specific content collection, while images satisfying the conditions and rules with a lower degree of relevance may be added to a list of candidates for subsequent tracking and periodic evaluation of their relevance.

In accordance with another aspect of this application, a server includes a processor and memory. The memory includes one or programs executable by the processor to perform the above-described method.

In accordance with another aspect of this application, a non-transitory computer readable storage medium stores one or more programs configured for execution by a computer. The one or more programs include instructions for implementing the above-described method.

Other embodiments and advantages may be apparent to those skilled in the art in light of the descriptions and drawings in this specification.

BRIEF DESCRIPTION OF THE DRAWINGS

Like reference numerals refer to corresponding parts throughout the drawings.

DETAILED DESCRIPTION

Figure 1:
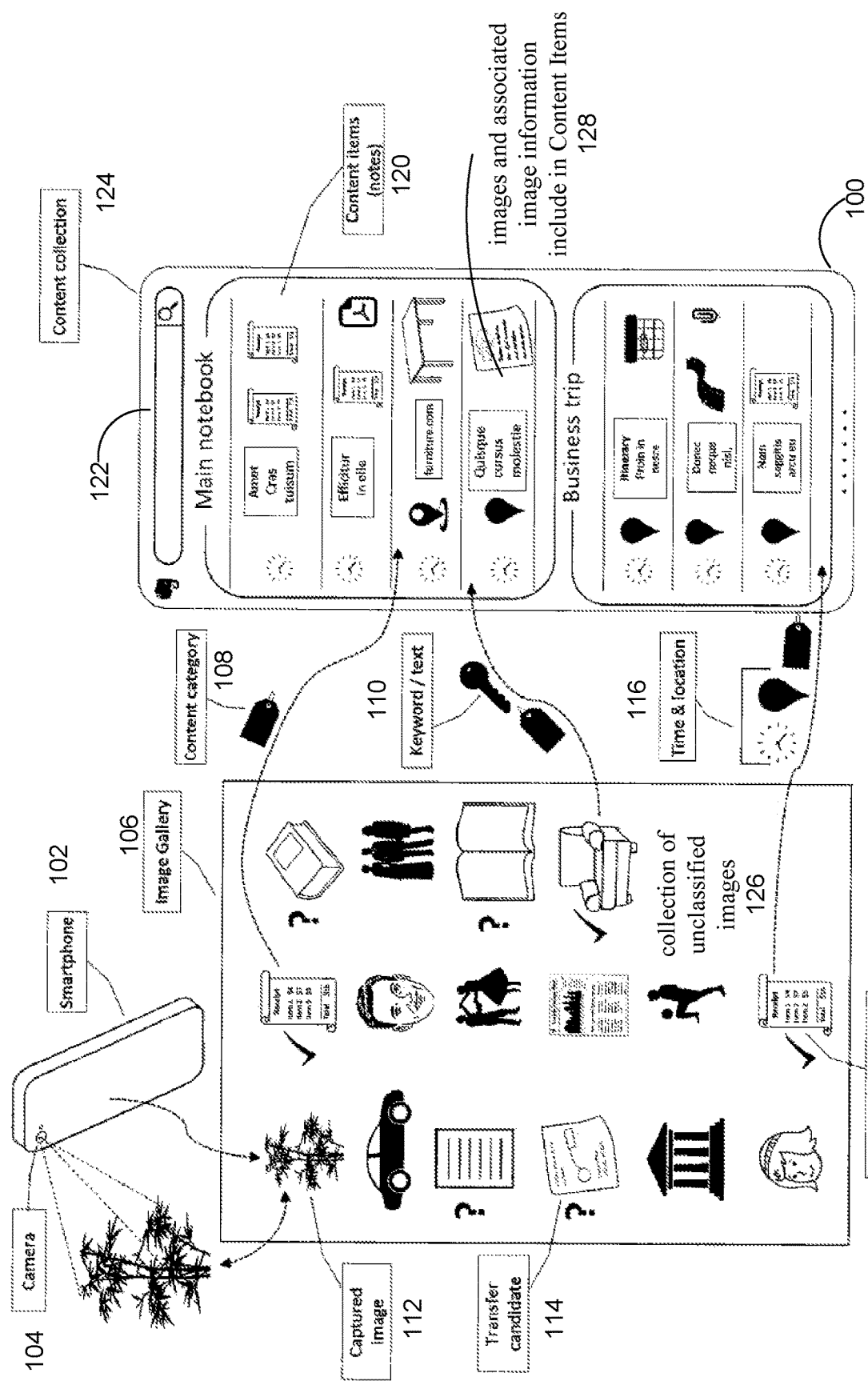
FIG. 1 is a visual representation of the interaction between a user interface and a gallery including a collection of unclassified images.

Users of the content management systems, such as Evernote, are facing growing content overload and increasing costs in organizing images within their content collections. For example, an average iPhone image gallery has been estimated to have 630 photographs (the average user in Japan is estimated to have an image gallery of 1500 photographs). The average user adds an average of 182 photographs to their image gallery each month. Accordingly, it is increasingly important to develop methods and systems for automatic identification and transfer of relevant image data from image galleries on a user electronic device (e.g. smartphone) to content collections maintained by the user.

1. Phase A: Building Relevance Conditions and Rules.

In some implementations, the method builds or generates relevance conditions and rules by analyzing image data present in a content collection. The method assesses user preferences and organization of images at the start of system functioning by analyzing the content collection for the presence and organization of image data. Images within the content collection are processed and categorized. In some implementations, images containing text, such as photographs of document pages, forms, receipts, whiteboards, banners, signs, etc. are processed separately. In some implementations, text within respective images is recognized fully or partially, where possible, and image search indexes are built using the recognized text. The image analysis of the content collection may result in several image categories— for example, receipts, [paper] handwritten notes, portrait photos, cars, etc. Each category may be initially assigned a weight, reflecting the quantity of photographs in each category, their time distribution (more recent images may carry higher weights), distribution by locations, etc.

In some implementations, the method analyzes texts present in content items (e.g., content items saved in one or more user content collections) side-by-side with images to identify additional semantic ties wherever possible. For example, if a content item contains an image representing a web page clip, wherein the web page clip is recognized using image analysis processing as a table, and the site address associated with the web page belongs to the domain furniture.com, the word "furniture" may be added as a keyword in associated with the web page clip and may be included in a subsequently built or generated relevance rule.

Another aspect of this implementation includes analyzing user organization of image data in the content collections. For example, if a user has tags or notebooks (e.g., sub-collections of content items) dedicated to certain types of images, such as receipts, invoices, tax forms, field photos, book covers, handwritten Post-it stickers, wine labels, restaurant menus, Moleskine pages, as well as activities or events—business or personal trips, conferences, etc., then some or all of the organizational units may be used to generate corresponding image relevance rules.

One specific example of an image relevance rule is demonstrated by a general receipt collection rule that is represented by a significant number of images identified as receipts (e.g., photos taken by a user of business and/or personal receipts and then saved in the user's content collection) grouped within a content item and/or spread between multiple content items. Additional user defined groupings of such content items by tags (grocery, sports) or notebooks (finance, expense), as well as a noticeable presence of recent images (i.e. recent image capture date) may increase the relevance weight of the rule.

In a second example of a relevance rule, a recent clip (e.g., saved in the user content collection) from the "furniture.com" web site with furniture images and additional photos or clips with similar images may hint at a furniture collection rule showing user interest in home furnishing. Additional tags or user entered text referring to furnishing, remodeling, home improvements, and similar topics may further increase the relevance weight of the rule.

In another example of a relevance rule, a receipt posted within a content item belonging to a notebook "Business Trip NNN" and including multiple data points about a particular business trip may represent an alternative receipt collection rule than the first example. This alternate receipt collection rule may indicate that a user is collecting receipts during a business trip for reporting and reimbursement purposes. Under this alternate image relevance rule, images of receipts filed into a corresponding notebook would be taken throughout the duration of a business trip and have associated location information corresponding to one of the business trip destinations. In other words, the rule is controlled by the image type (receipt), date range, and location range.

In some implementations of this application, building or generating image relevance rules may be adequate for extensive content collections with many images. For small content collections, small image presence, and for new users the system may use pre-built rules. For example, at the system configuration phase, images of paper documents within image galleries may be categorized in various ways based on textual content or an explicit user choice of desired categories.

2. Phase B: Processing Image Gallery and Transferring Relevant Images.

In accordance with various implementations of this application, the method includes processing an image gallery or other unclassified images and transferring (copying, moving, or storing) relevant images. An image gallery can be any collection of unclassified images (e.g. photo gallery captured by a user on a smartphone or individual video frames). The method scans an image gallery (i.e. applies the generated rule sets to an image gallery), identifies relevant images, assesses relevance scores and may file or store the most relevant images directly to the content collection. Image relevance rules are updated simultaneously as relevant images are stored directly to the content collections. The method may designate items with moderate relevance scores as candidates for transfer to the content collection and continue to track the candidates for some time, periodically recalculating their respective relevance scores. As a result, portions of an image gallery may automatically be transferred (copied, moved, or stored) to the content collection saving the user the time and effort of manual filing. Semantic searches may be used as a two-way relevance identification method between image descriptions received at the gallery image recognition phase and objects in the content collection, including individual components of relevance rules.

In another implementation of this application, the method may run the same image recognition, categorization, text extraction, indexing and processing that had been performed in the first phase against one or more unclassified images. The analysis performed on one or more galleries that include one or more unclassified images may be easier and more efficient in this phase because the system already generated a list of categories, conditions and rules corresponding to the content collection in Phase A.

Images determined to not be relevant are left in the gallery untouched. For relevant images, the system will attempt to apply the image relevance rules and calculate relevance scores according to various rules, whether the rules are complimentary or conflicting. An aggregate relevance score of an unclassified image in a gallery may be defined as the highest score for a group of complementary rules satisfied by the image.

In some implementations, if an aggregate relevance score for an unclassified gallery image is above a predefined threshold, the unclassified image may be immediately transferred into the content collection; its destination is defined by the group of image relevance rules applied to determine the aggregate score. The corresponding image relevance rules may simultaneously be updated and the respective image relevance rule weight(s) increased. For example, if an image gallery contains an unclassified photo of a receipt taken (a) at a time a user is verifiably traveling for business; (b) at a location corresponding to one of the user's business destinations; and (c) the user has a pattern of collecting receipts during business trips in notebooks dedicated to each business trip, then the business trip rule defined in Phase A above applies (i.e. "Business Trip NNN"). The business trip rule would set the destination of the newly classified image (i.e. The photo of the receipt) as a new content item in the content collection notebook created for the current business trip.

Image relevance rules with respective weights below the relevance threshold do not justify immediate transferring of unclassified images into the content collection. But image relevance rules with weights below the relevance threshold can be used to determine one or more candidate images from the one or more unclassified images. For example, the content collection may have a small number of photographs of handwritten notes scattered across the collection. The scattered photographs of handwritten notes may have been stored for a long period of time without any explicit effort by the user to organize the images. A photograph of a new unclassified handwritten note in an image gallery may not necessarily satisfy the requirement for immediate storage to the content collection. The system may add the unclassified photograph of the handwritten note to a list of candidates and continue monitoring the situation and periodically reassessing the note's relevance score. If, for example, the user starts organizing existing handwritten notes in the content collection, the image relevance rules may be updated and their respective weights increased to indicate a desired destination for the candidate note. When the candidate note satisfies the relevance criterion it may subsequently be added to the content collection.

In some implementations the method may also work in a semi-automatic mode informing the user about the possibility of transferring images to the content collection and optionally receiving user approval for some the actions performed by the method.

FIG. 1 is a visual representation of interactions between a user interface of a mobile application 100 showing a view of a content collection 124 and an image gallery 106 that includes a collection of unclassified images 126 that are candidates for classification and inclusion in the content collection. FIG. 1 shows a user interface 100 with a personal content collection 124 of a user. The user interface includes a field 122 for a user entry of a search query. The content collection 124 contains content items 120 that include one or more images and associated image information 128. In some implementations, the images are organized in categories that can be defined by a user. In some implementations, a client device 102 with a built in camera 104 stores an image gallery 106 (e.g., of images captured by the camera 104 and/or downloaded and/or transferred from other sources of images). The image gallery 106 contains one or more captured images 112. The captured images 112 are analyzed by one or more processing modules (e.g., a content collection analyzing module 418 (FIG. 4) and assigned one or more of a content category 108, keyword or text 110, and time and/or location 116 based on the analysis. Captured images 112 or one or more unclassified images in the collection of unclassified images 126 satisfying a predefined relevance criterion are automatically transferred or stored in the content collection 124. For example, in FIG. 1 an unclassified image of a receipt is auto-transferred 118 to the personal content collection of a user 124 following a determination by one or more processing modules (e.g., one or more of the server-side modules 414) that the image has a high degree of relevance to other items in the content collection based on application of the generated relevance rules. Captured images 112 or one or more unclassified images in the collection of unclassified images 126 falling below the predefined relevance criterion are listed as transfer candidates. For example, in FIG. 1 a photograph of class notes that has not been classified is listed as a transfer candidate 114. Transfer candidates are periodically monitored and re-evaluated for an updated relevance score.

Figure 2:
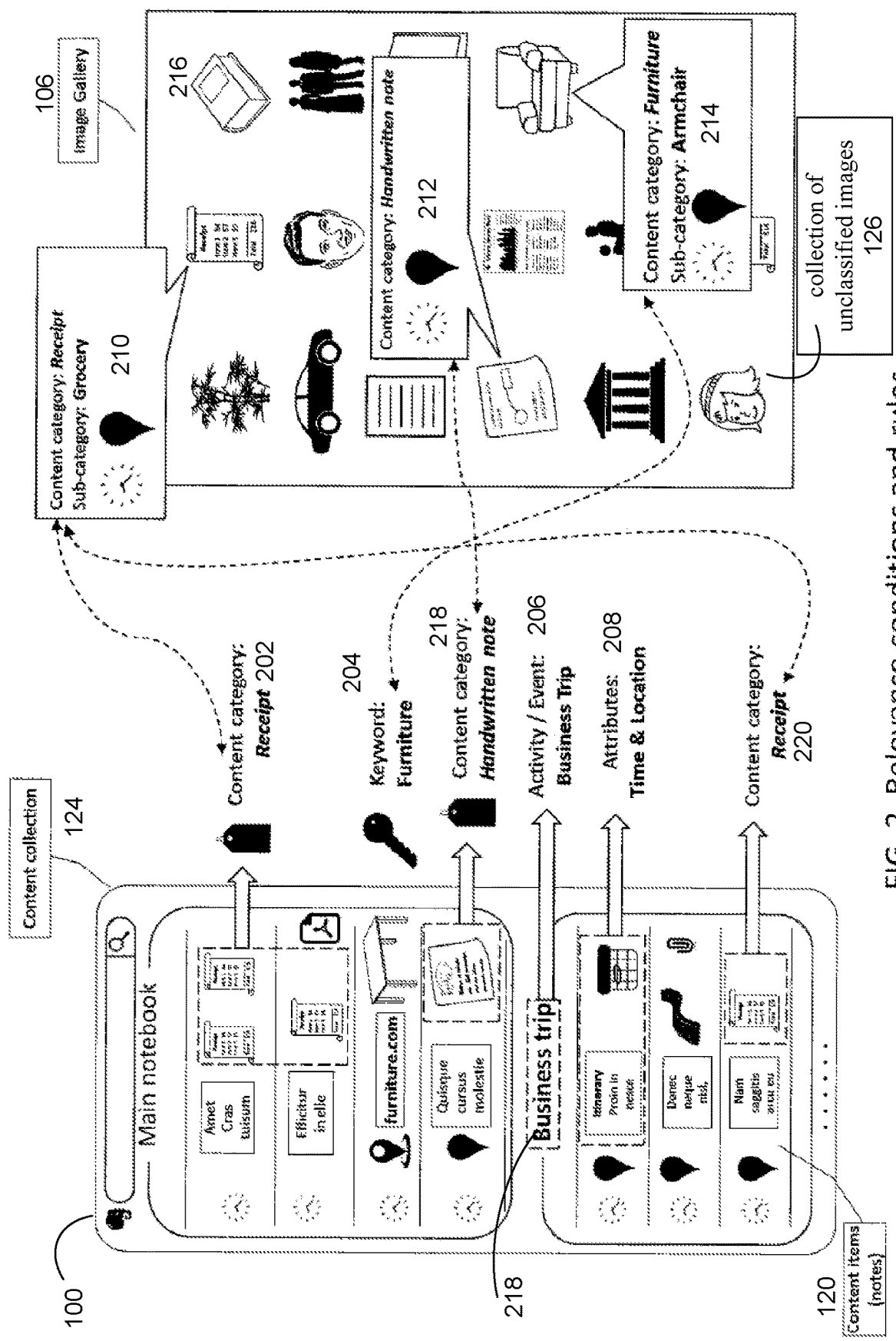
FIG. 2 is another visual representation of the interaction between a user interface and a gallery including a collection of unclassified images.

FIG. 2 is another visual representation of interaction between a user interface of a mobile application 100 showing a view of a content collection 124 and an image gallery 106 that includes a collection of unclassified images 126 that are candidates for classification and inclusion in the content collection. FIG. 2 shows a user interface 100 with a personal content collection 124 of a user. The content collection 124 contains content items 120 that include one or more images and associated image information. Further, the content collection contains organizational categories, such as "Business trip" 218. The associated image information includes one or more of a content category 202, a keyword 204, activity or event 206, attributes 208. The image gallery 106 contains a plurality of unclassified images 216 that are associated with the relevance conditions and rules. For example, receipt image 210 in the image gallery 106 is associated with a content category 202, content category 220, a time and location attribute, and a sub-category, grocery. The handwritten note image 212 similarly is associated with content category handwritten note 218 and a time and location attribute. Further the armchair image 214 is associated with a content category for furniture, a sub-category for armchair, a keyword 204, and a time and location attribute.

Figure 3:
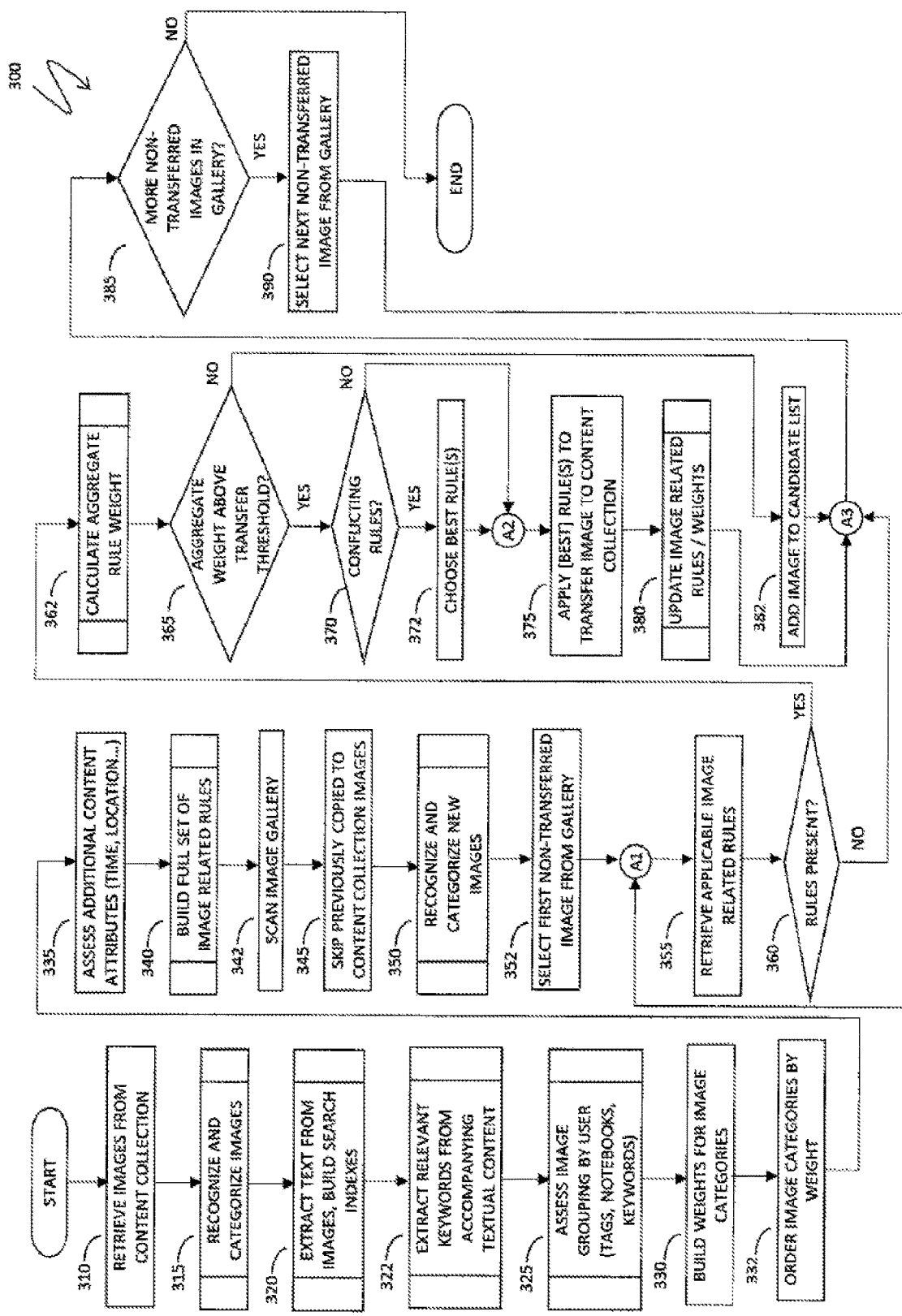
FIG. 3 is an example flow diagram of illustrating a method for automatically identifying and transferring relevant image data, in accordance with some implementations.

FIG. 3 is a flow diagram 300 of an implementation for automatically identifying and transferring relevant image data. In accordance with some implementations, the method begins by retrieving images from a content collection (310). The content collection (310) can be stored on a server or on an electronic device and includes content items, wherein the content items include images and associated image information. The content items can be analyzed to identify attributes associated with the images, wherein the attributes include one or more of image data, image categories, and image groupings. In some implementations, the method includes analyzing the content collection to recognize and categorize the images or content items (315). Text from the images or the content items can be extracted and used for building search indexes (320). Relevant keywords can be extracted from the accompanying textual content (322). In some implementations, the method assesses user image groupings (tags, notebooks, keywords) (325). The method further builds weights for image categories (330), and orders image categories by weight (332). Images and content items are assessed for additional content attributes (time, location . . . ) (335). A full set of image related rules is built or generated (340). The method scans the one or more image galleries, in other words, applies the generated image related rules to one or more image galleries or a collection of one or more unclassified images (342) skipping images previously copied to content collection (345). The one or more unclassified images are recognized and categorized (350).

After selecting a first non-transferred (i.e. unclassified) image from one or more galleries that include one or more non-transferred images (352), the method retrieves applicable image related rules (355). If no rules are present (360), then the method looks for more non-transferred images in the one or more galleries (385). If there are no more non-transferred images in the one or more galleries (385), then the operation ends. If there are more non-transferred images in the one or more galleries (385) the method returns to retrieving applicable image related rules (355). If there are rules present (360), then the method calculates aggregate rule weight (362). The method determines if the aggregate weight is above transfer threshold (365). If the aggregate weight is not above transfer threshold (365), then the image is added to a candidate list (382). If the aggregate weight is above transfer threshold (365), then the method looks for conflicting rules (370). If there are conflicting rules (370), the method chooses the best rule(s) (372) before applying the rules. If there are no conflicting rules (370), then the method bypasses choosing a best rule(s) (372).

The method applies the rules or determined best rules to the unclassified image selected for transfer to the content collection (375). After the unclassified image selected for transfer is in the content collection (375), the method updates image related rules and weights (380). The method looks for more non-transferred images in gallery (385). If there are no more non-transferred images in the one or more galleries (385), then the method ends. If there are more non-transferred images in the one or more galleries (385) the method returns to retrieving applicable image related rules (355). The process continues until there are no more non-transferred images in the one or more galleries (385).

Figure 4:
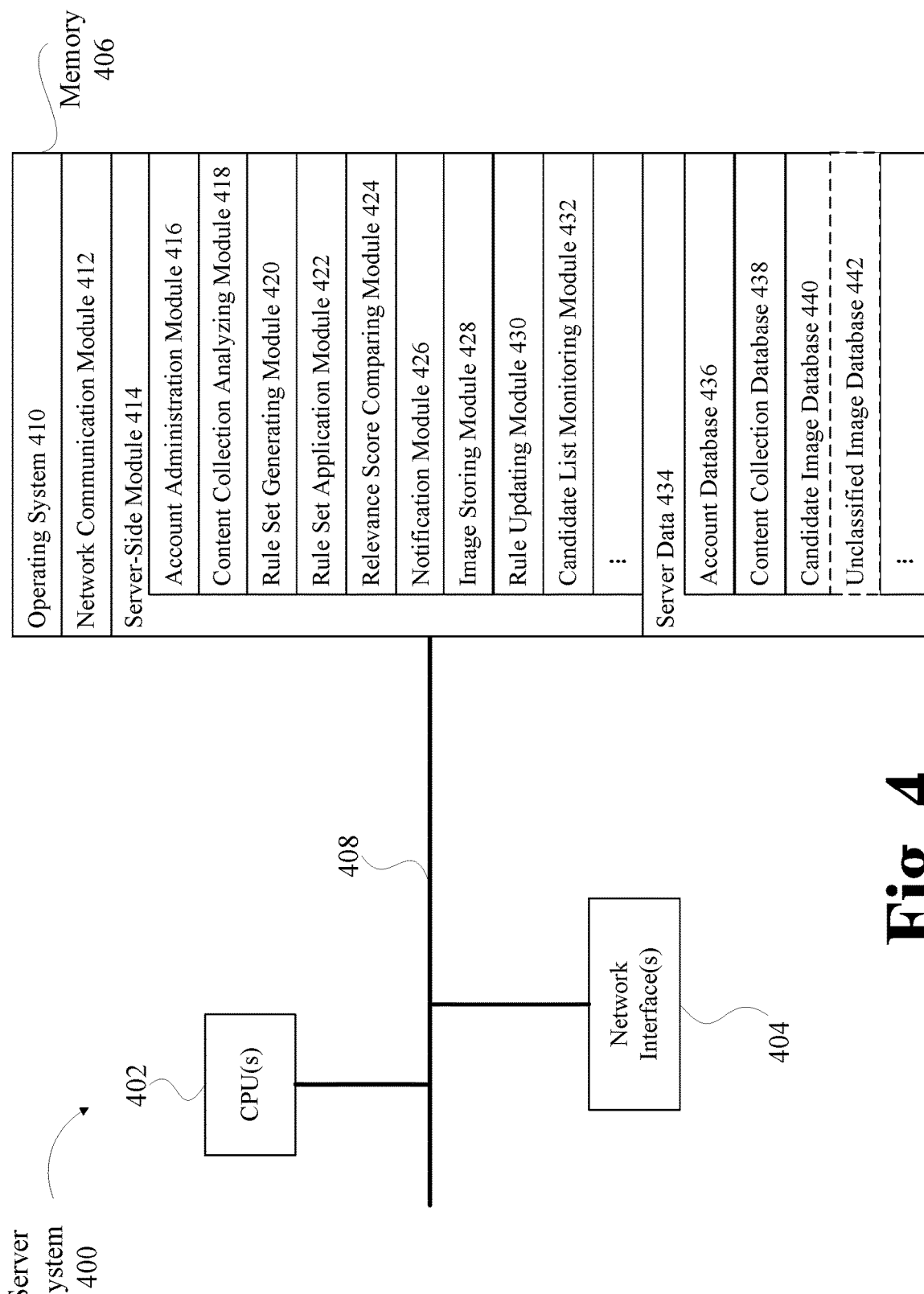
FIG. 4 is an example block diagram of illustrating a server system, in accordance with some implementations.

FIG. 4 is block diagram of a server system 400 in accordance with some implementations. The server system 400 includes one or more processing units (CPUs) 402, one or more network interfaces 404, Memory 406, and one or more communication buses 408 for interconnecting these components (sometimes called a chipset). Memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 406, optionally, includes one or more storage devices remotely located from one or more processing units 402. Memory 406, or alternatively the non-volatile memory within memory 406, includes a non-transitory computer readable storage medium. In some implementations, memory 406, or the non-transitory computer readable storage medium of memory 406, stores the following programs, modules, and data structures, or a subset or superset thereof:

- Operating system 410 including procedures for handling various basic system services and for performing hardware dependent tasks;
- Network communication module 412 for connecting the server system 400 to other computer systems (e.g., a client device) via one or more network interfaces 404 (wired or wireless);
- Server-Side Module 414 for executing automatic identification and transferring relevant image data in accordance with the various sub-modules;
- Server data 434 storing data associated with the one or more applications, including, but is not limited to:
  - Account Database 436 storing information related with user accounts of the content collection application 100;
  - Content Collection Database 438 storing content items, including images and associated image information;
  - Candidate Image Database 440 storing a plurality of unclassified images (move this to discussion of automatic re-evaluation: below a predetermined relevance criterion); and
  - (Optional) an Unclassified Image Database 442 storing a plurality of unclassified images to provide to the server side module 414 for analysis. The information stored in the unclassified image database 442 can include images of objects, individual frames or collections of video frames, and/or images that include both objects and text (e.g., text that is be part of a scene depicted in the image or annotations/captions for the image).

In some implementations, the server-side module 414 includes one or more of the following: an account administration module 416 and a content collection analyzing module 420 to analyze content items within the content collection data 436. The content items within the content collection are analyzed to identify attributes associated with the images, wherein the attributes include one or more of image data, image categories, and image groupings. The server-side module 414 further includes one or more of a rule set generating module 420 for building or generating relevance conditions and rules from the content item analysis, and a rule set application module 422 for applying the rule sets to a plurality of unclassified images to determine one or more of a category, grouping, and image relevance scores specific to the user. One or more of a relevance score comparing module 424 is included in the server-side Module 414 to identify one or more of the unclassified images with determined relevance scores satisfying a predetermined relevance criterion (i.e. a first set) or falling below a predetermined relevance criterion (i.e. a second set).

The server-side module 414 also includes one or more candidate list monitoring modules 432 to periodically monitor the second set, periodically update respective image relevance scores of the second set, and identify a third set of one or more of the second set with determined relevance scores satisfying the predetermined relevance criterion. The second set is stored in the candidate image database 440 on the server system 400. One or more of an image storing module 428 is included in the server-side module 414 to associate each image of the first set, or alternatively a third set, with the content items in accordance with the one or more determined category and/or grouping and to store the first set, or third set, in the personal content collection. Further included in the server-side module 414 is one or more notification module 426 to notify a user of the potential storage of the unclassified image and to optionally prompt the user for approval, and a rule updating module 430 to update the generated rule sets after associating one or more unclassified images set with the content items and storing the one or more unclassified images.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 406, optionally, stores a subset of the modules and data structures identified above. Furthermore, memory 406, optionally, stores additional modules and data structures not described above. In some implementations, one or more operations performed by the service modules 414 are performed on a client device (e.g., client device 102 FIG. 1 or client device 02 (FIG. 5)) based on unclassified and/or classified images and/or related information stored on the client device and/or on a server with which the client device is coupled (e.g., all or a portion of a user content collection, including classified images and related information, or unclassified images and other content items, e.g., corresponding to at least a portion of the server data 434).

A person skilled in the art would recognize that particular embodiments of the server system 400 may include more or fewer components than those shown. One or more modules may be divided into sub-modules, and/or one or more functions may be provided by different modules than those shown. In some embodiments, an individual one of server system 400 implements or performs one or more methods described herein with respect to FIGS. 3 and 5. In some embodiments, a plurality of machines (e.g., a local computer and one or more remote servers) together implement or perform one or more methods described with respect to FIGS. 3 and 5. For example, a first computer system (e.g., a server) obtains an image gallery containing a plurality of unclassified images from a second computer system (e.g., a local computer) via one or more wired or wireless communication networks. The first computer system analyzes content items from a personal content collection associated to the second computer, generates rule sets, applies the generated rule sets to a plurality of unclassified images. The first computer identifies a first set of one or more of the unclassified images with determined relevance scores satisfying a predetermined relevance criterion, associates each image of the first set with the content items in accordance with the one or more determined category and grouping, and stores the first set in the personal content collection associated to the second computer. More details on automatically identifying and transferring relevant image data are provided herein with reference to FIGS. 1-8.

Figure 5:
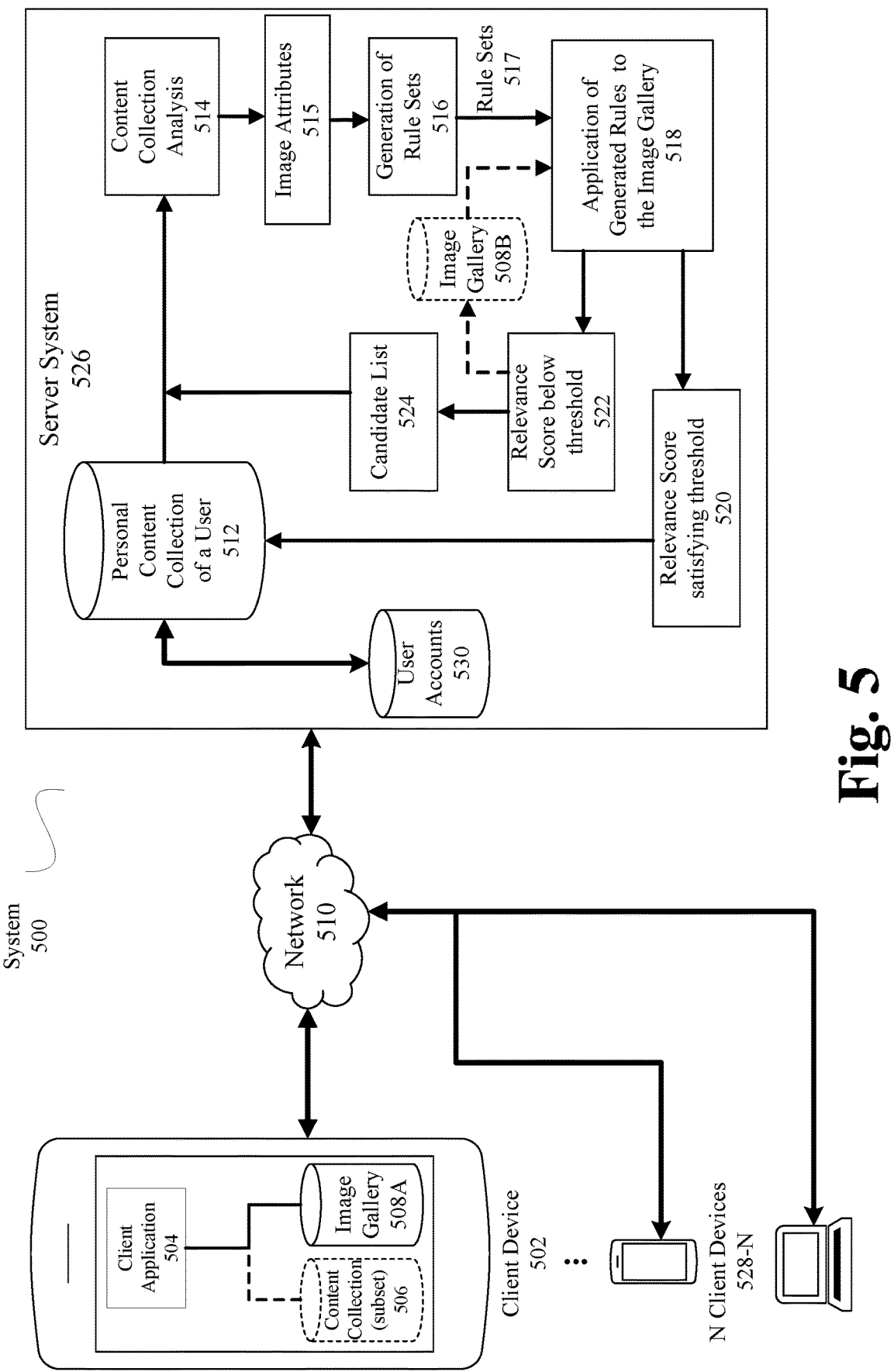
FIG. 5 is an example block diagram illustrating an overview of the method implemented at a server.

FIG. 5 is a functional block diagram of a system 500 (e.g., depicting stored data, processing modules, interconnections, processing/messaging flow, etc), in accordance with some implementations. The system 500 includes a client device 502 (e.g., phone, smart phone, computer, or other electronic devices with access to a network, a collection of images and/or a built in camera and) with a client application 504, a stored image gallery 508A (e.g., stored, unclassified images), and optionally, a content collection 506 (e.g., a subset of the content collection 512 stored on the server 526) stored on the client device. Any number of N client devices 528-N (where N denotes an indeterminate number of devices) with their own respective personalized content collections and stored/unclassified images can be a part of the system 500 at any given time. A communication network 510 interconnects the client device 502 and any number of N client devices 528-N with the server system 526, which includes/manages in some implementations locally stored user accounts 530 and a personal content collection of a user 512 (and users of any number of N other client devices 528). The personal content collection of a user 512 stores content items that include images and associated image information. In some implementations, the images are classified and organized in accordance with keywords/organization provided by a user and/or generated automatically, without user intervention, (e.g., through application of content collection analysis and generation of rule sets performed by respective server system modules 514, 516).

In some implementations, the personal content collection 512 includes a variety of digital content items collected through a variety of collection operations, including user web clipping, automated content collection performed by the server system 526 and/or a client application 504, and/or uploading (e.g., by a user or a user organization) of items of interest to the content collection 512. In some implementations, the images are classified and organized in accordance with keywords/organization provided by a user and/or generated automatically without user intervention, In relation to assisted/automatic classification and/or organization of unclassified user content (e.g., content from the image gallery 508A), and addition of such content to a personal content collection 512, the personal content collection of a user 512 provides content items for content collection analysis performed by a content collection analysis processing module 514. The content collection analysis module 514 identifies attributes associated with the images (e.g., images from the content collection 512), wherein the attributes include one or more of image data, image categories, and image groupings.

In some implementations, identified attributes 515 generated by content collection analysis 514 (e.g., attributes associated with the images from the content collection 512) are employed by a generation of rules module 516 to generate image classification rules 517. For example, the generation of rules module 516 builds and/or generates relevance conditions and rules 517 based on the identified attributes 515 associated with images from the content collection, wherein the generated rules 517 can be applied to unclassified image content to determine a degree of relevance of that image content to the content collection 512 (both overall and to specific groups/keywords within the content collection 512). In some implementations, the generated rule sets 517 along with a plurality of unclassified images within the image gallery 508A/B are provided for application of generated rules to the image gallery 518 to determine for each of the unclassified images one or more of a category, grouping, and image relevance scores associated that image. In some implementations, the application of generated rules to the image gallery module/operation 518 also identifies a first set of one or more of the unclassified images with determined relevance scores satisfying a predetermined relevance criterion 520 and a second set of one or more of the unclassified images with determined relevance scores below a predetermined relevance criterion 522. Each image of the first set is associated with the content items in accordance with the one or more determined category and grouping and stored in the personal content collection 512. The second set is placed in a Candidate List 524 to be continuously monitored and periodically updated for new respective image relevance scores. A third set of one or more of the second set is identified with determined relevance scores satisfying the predetermined relevance criterion. Each image of the third set is associated with the content items in accordance with the one or more determined category and grouping and stored in the personal content collection 512.

Figure 6:
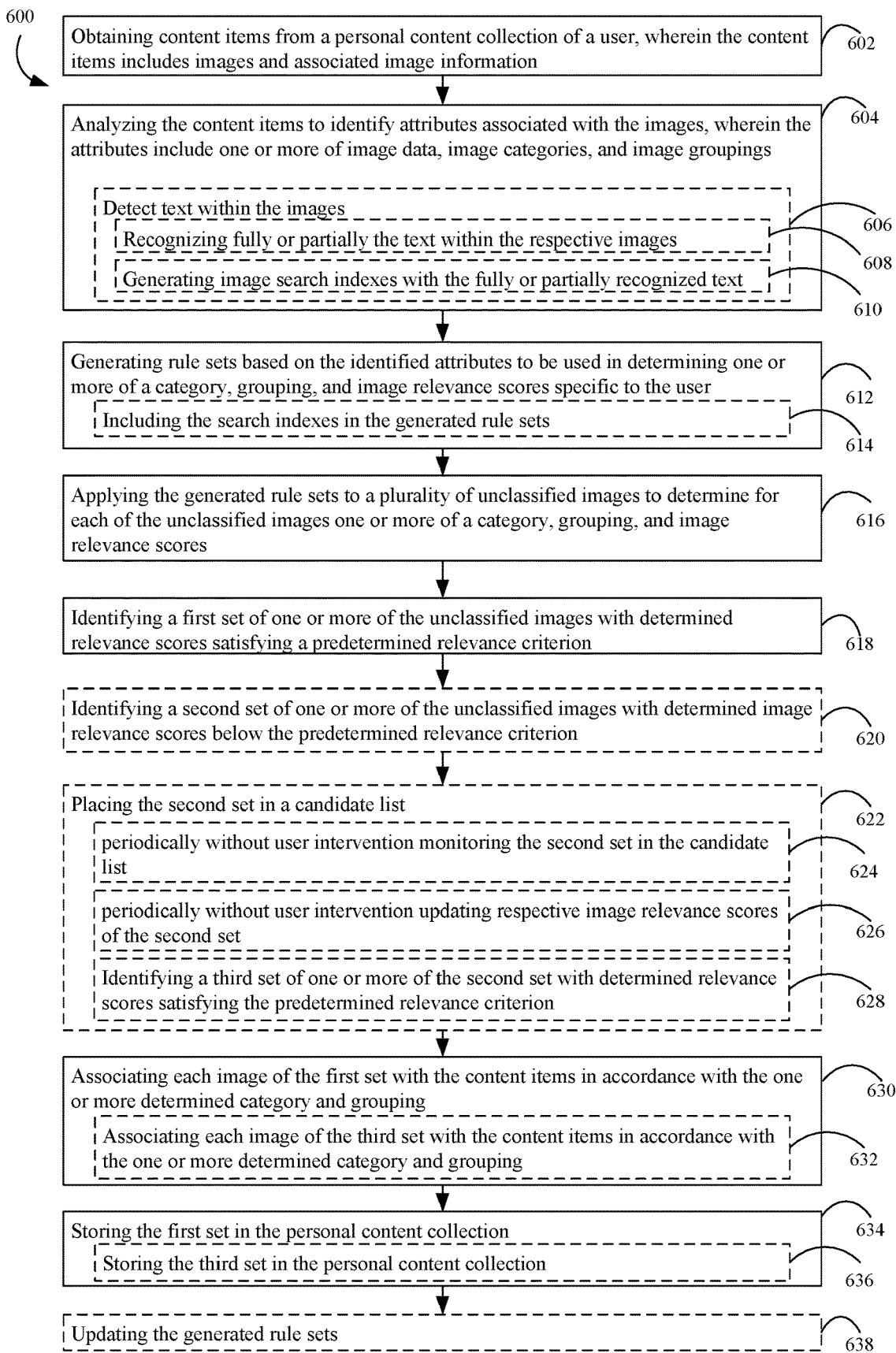
FIG. 6 is an example flow diagram of illustrating a method for automatically identifying and transferring relevant image data, in accordance with some implementations.

FIG. 6 is a flow chart in accordance with some implementations of a method 600 for automatically identifying and transferring relevant image data. In some implementations, the method is performed by a one or more processing modules of a server system 526, a client device 502/528-N system and/or a combination of the preceding. In some implementations, the data operated on by the modules, including but not limited to unclassified images and content collection for a user, are stored at the server system 526, at the client device 502/528-N system and/or a combination of the preceding. In some implementations, the method obtains content items from a personal content collection of a user (602), which includes images and associated image information (such as keywords and classification information). The method analyzes the content items to identify attributes associated with the images (604), which include one or more of image data, image categories, and image groupings. In some implementations the method detects text within the images (606), recognizes fully or partially the text within the respective images (608), and generates image search indexes with the fully or partially recognized text (610). The method generates rule sets based on the identified attributes to be used in determining one or more of a category, grouping, and image relevance scores specific to the user (612). In some implementations the method includes the search indexes in the generated rule sets (614), which enables the generated search indexes to be application to an image classification operation in conjunction with the rules sets. The method applies the generated rule sets to a plurality of unclassified images to determine for each of the unclassified images one or more of a category, grouping, and image relevance scores (616). The method further identifies a first set of one or more of the unclassified images with determined relevance scores satisfying a predetermined relevance criterion (618). In some implementations the method identifies a second set of one or more of the unclassified images with determined image relevance scores below the predetermined relevance criterion (620). In some implementations, optionally, the second set is placed in a candidate list (622) for possible reclassification in view of updated generated rule sets (e.g., rule sets updated in view of subsequent user images/content items classified and included in the content collection maintained by the server system). In some implementations, optionally, the second set in the candidate list is periodically, without user intervention, monitored for classification (624). In some implementations, optionally, respective images of the second set in the candidate list are periodically, without user intervention, updated with new image relevance scores (626). In some implementations, optionally, the method further identifies a third set of one or more of the second set with determined relevance scores satisfying the predetermined relevance criterion 628. In some implementations, each image of the first set is associated with the content items in accordance with the one or more determined category and grouping (630) and stored in the personal content collection (634). In some implementations, optionally, simultaneously, each image of the third set is associated with the content items in accordance with the one or more determined category and grouping (632) and stored in the personal content collection (636). In some implementations, optionally, the method updates the generated rule sets 638 after the first set is stored in the personal content collection 634. In some implementations, the operations described above and depicted in FIG. 6 can be performed in different order from the described order, and different subsets or supersets of the operations can be performed to provide at least some benefits described herein related to automated classification and inclusion in a digital content collection of unclassified images and/or text content items.

Figure 7:
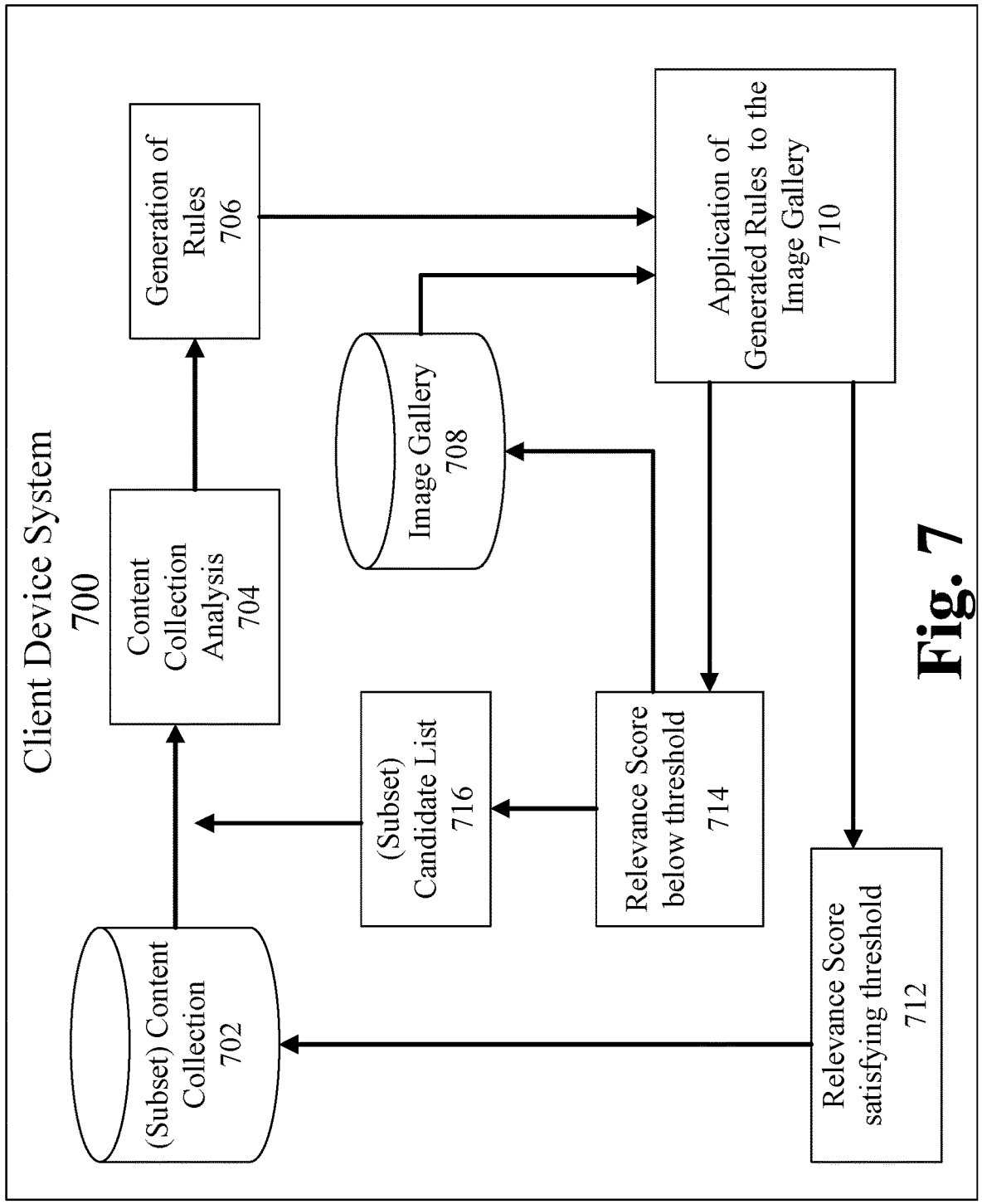
FIG. 7 is an example of the method implemented on a client device, in accordance with some implementations.

FIG. 7 is a functional block diagram of a system implemented at a client device 700 in accordance with some implementations. FIG. 7 is a client device implementation of operations described with reference to FIG. 5. Therefore, the descriptions of FIG. 5 apply to the client context described with reference to FIG. 7 as appropriate. The overall system includes a client device system 700 (phone, smart phone, computer, or other electronic devices with a built in camera and access to a network), a stored image gallery 708, a content collection 702 stored on the client device. The content collection 702 stores content items that includes images and associated image information. The content collection 702 sends the content items for content collection analysis 704. Content collection analysis 704 identifies attributes associated with the images, wherein the attributes include one or more of image data, image categories, and image groupings. After the analysis is complete, identified attributes associated with the images are sent for generation of rules 706. The generation of rules 706 builds relevance conditions and rules by using the identified attributes associated with the images. The generated rule Sets 706 along with a plurality of unclassified images within the image gallery 708 are provided for application of generated rules to the image gallery 710 to determine for each of the unclassified images one or more of a category, grouping, and image relevance scores. application of generated rules to the image gallery 710 also identifies a first set of one or more of the unclassified images with determined relevance scores satisfying a predetermined relevance criterion 712 and a second set of one or more of the unclassified images with determined relevance scores below a predetermined relevance criterion 714. Each image of the first set is associated with the content items in accordance with the one or more determined category and grouping and stored in the personal content collection 702. The second set is placed in a candidate list 716 to be continuously monitored and periodically updated for new respective image relevance scores. A third set of one or more of the second set is identified with determined relevance scores satisfying the predetermined relevance criterion. Each image of the third set is associated with the content items in accordance with the one or more determined category and grouping and stored in the personal content collection 702.

Figure 8:
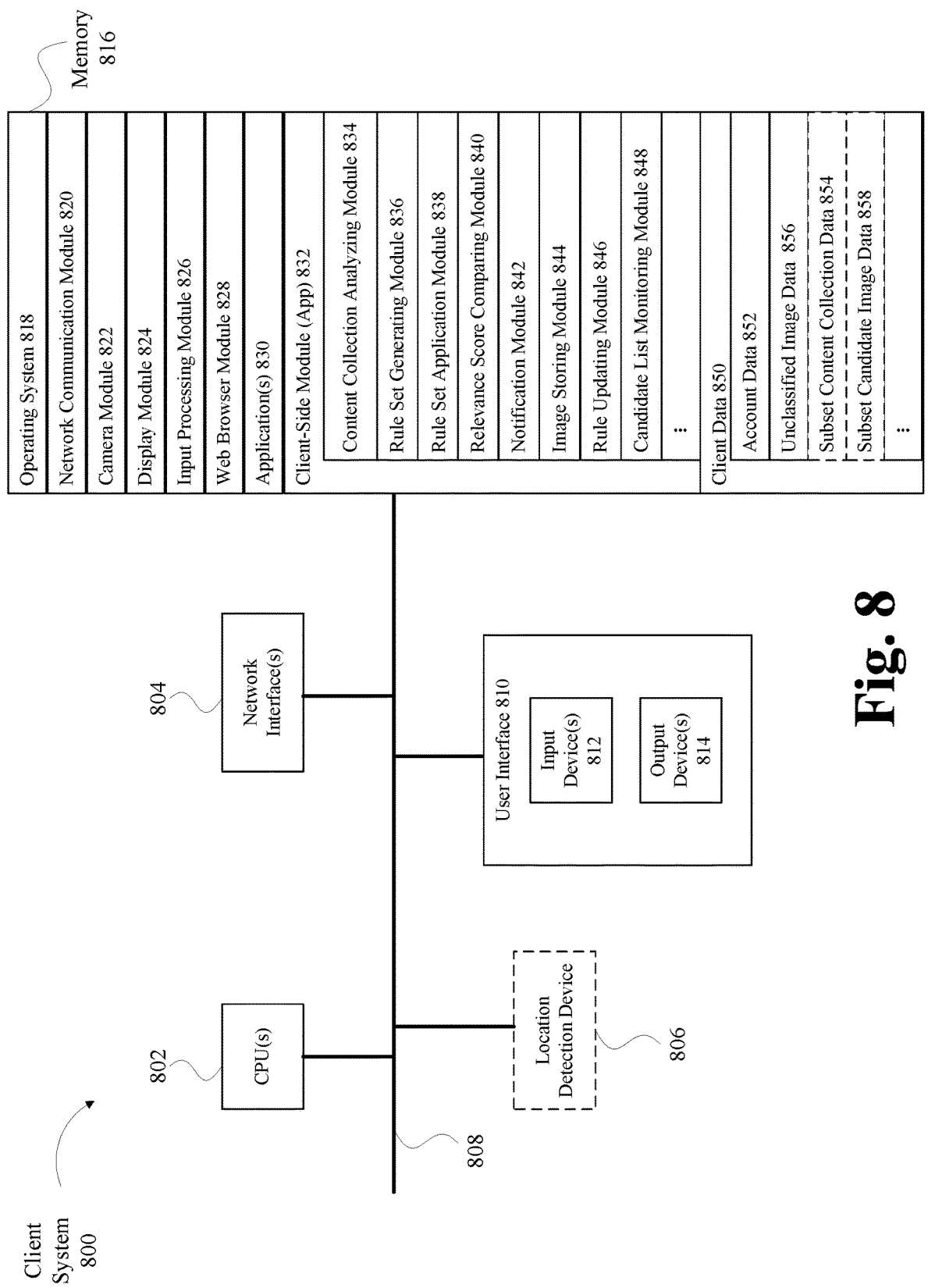
FIG. 8 is an example block diagram of illustrating a client device, in accordance with some implementations.

FIG. 8 is block diagram of a client system 800 in accordance with some implementations. The client system 800 includes one or more processing units (CPUs) 802, one or more network interfaces 804, a user interface 810 with one or more input devices 812 and one or more output devices 814, an optional location detection device 806, memory 816, and one or more communication buses 808 for interconnecting these components (sometimes called a chipset). Memory 816 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 816, optionally, includes one or more storage devices remotely located from one or more processing units 802. Memory 816, or alternatively the non-volatile memory within memory 816, includes a non-transitory computer readable storage medium. In some implementations, memory 816, or the non-transitory computer readable storage medium of memory 416, stores the following programs, modules, and data structures, or a subset or superset thereof:

- Operating system 818 including procedures for handling various basic system services and for performing hardware dependent tasks;
- Network communication module 820 for connecting the client system 800 to other computer systems (e.g., a server system,) via one or more network interfaces 804 (wired or wireless);
- Camera module 822 for capturing unclassified images;
- Display module 824 for enabling the display presentation of information or images (e.g., a graphical user interface for application(s) 830, widgets, websites and web pages thereof, and/or games, audio and/or video content, text, etc.) at the Client System 800 via one or more output devices 814 (e.g., displays, speakers, etc.) associated with user interface 810;
- Input processing module 826 for detecting one or more user inputs or interactions from one of the one or more input devices 812 (e.g., a keyboard) and interpreting the detected input or interaction in conjunction with one or more applications 830;
- Web browser module 828 for navigating, requesting (e.g., via HTTP), and displaying websites and web pages thereof in a browser application;
- Client-Side module (App) 832 for executing automatic identification and transferring relevant image data in accordance with the various sub-modules locally on the client device or in communication with a server system;
- Client data 850 storing data associated with the one or more applications, including, but is not limited to:
    - Account data 852 storing information related with user accounts of the content collection application 100;
    - (Optional) Content collection data 854 storing content items, including images and associated image information. Content Collection Data 854 is used when the Client System 800 does not have access to a network or if a user would like to maintain a subset of the Content Collection Data 854 locally stored on the device a subset;
    - (Optional) Candidate image data 858 storing a plurality of unclassified images below a predetermined relevance criterion. Candidate image data 858 is used when the client system 800 does not have access to a network or if a user would like to maintain a subset of the candidate image data 858 locally stored on the device a subset; and an unclassified image data 856 storing a plurality of unclassified images to provide to the client side module 832 for analysis or to send to a server system for analysis.

In some implementations, the client-side module 832 includes one or more of the following: a content collection analyzing module 834 to analyze content items within the content collection over the network or the content collection data 854 stored locally on the client system 800. The content items within the content collection are analyzed to identify attributes associated with the images, wherein the attributes include one or more of image data, image categories, and image groupings. The client-side module 832 further includes one or more of a rule set generating module 836 for building or generating relevance conditions and rules from the content item analysis, and a rule set application module 838 for applying the rule sets to a plurality of unclassified images to determine one or more of a category, grouping, and image relevance scores specific to the user. One or more of a relevance Score comparing module 840 is included in the client-side module 832 to identify one or more of the unclassified images with determined relevance scores satisfying a predetermined relevance criterion (i.e. a first set) or falling below a predetermined relevance criterion (i.e. a second set).

The client-side module 832 also includes one or more candidate list monitoring modules 848 to periodically monitor the second set, periodically update respective image relevance scores of the second set, and identify a third set of one or more of the second set with determined relevance scores satisfying the predetermined relevance criterion. The second set is stored in a candidate list on the network or can be stored locally on the client system 800 within candidate image data 858. One or more of an image storing module 844 is included in the client-side module 832 to associate each image of the first set, or alternatively a third set, with the content items in accordance with the one or more determined category and/or grouping and to store the first set, or third set, in the personal content collection. Further included in the client-side module 832 are one or more notification modules 842 to notify a user of the potential storage of the unclassified image and to optionally prompt the user for approval, and a rule updating module 846 to update the generated rule sets after associating one or more unclassified images with the content collection and storing therein of the one or more unclassified images.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 406, optionally, stores a subset of the modules and data structures identified above. Furthermore, memory 406, optionally, stores additional modules and data structures not described above.

A person skilled in the art would recognize that particular embodiments of the server system 400 may include more or fewer components than those shown. One or more modules may be divided into sub-modules, and/or one or more functions may be provided by different modules than those shown. In some embodiments, an individual 400 implements or performs one or more methods described herein with respect to FIGS. 3 and 5. In some embodiments, a plurality of machines (e.g., one or more local computers and one or more remote servers) together implement or perform one or more methods described with respect to FIGS. 3 and 5. For example, a first computer system (e.g., a server) obtains an image gallery containing a plurality of unclassified images from a second computer system (e.g., a local computer) via one or more wired or wireless communication networks. The first computer system analyzes content items from a personal content collection associated to the second computer, generates rule sets, applies the generated rule sets to a plurality of unclassified images. The first computer identifies a first set of one or more of the unclassified images with determined relevance scores satisfying a predetermined relevance criterion, associates each image of the first set with the content items in accordance with the one or more determined category and grouping, and stores the first set in the personal content collection associated to the second computer. More details on the automatically identifying and transferring relevant image data are provided herein with reference to FIGS. 1-8.

Reference is made herein in detail to implementations, examples of which are illustrated in the accompanying drawings. In the detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, mechanical structures, circuits, and networks have not been described in detail so as not to unnecessarily obscure aspects of the implementations.

It will also be understood that, although the terms first, second, etc. are, in some instances, used herein to describe various elements, these elements should not be limited by these terms. These terms are only used to distinguish one element from another. For example, a first answer term could be termed a second answer term, and, similarly, a second answer term could be termed a first answer term, without departing from the scope of the various described implementations. The first answer term and the second answer term are both answer terms, but they are not the same answer terms.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, components, structures and/or groups, but do not preclude the presence or addition of one or more other features, integers, steps, operations, elements, components, structures, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

It is noted that the computer system described herein is exemplary and is not intended to be limiting. For example, any components and modules described herein are exemplary and are not intended to be limiting. For brevity, features or characters described in association with some implementations may not necessarily be repeated or reiterated when describing other implementations. Even though it may not be explicitly described therein, a feature or characteristic described in association with some implementations may be used by other implementations.

Although various drawings illustrate a number of logical stages in a particular order, stages that are not order dependent may be reordered and other stages may be combined or broken out. While some reordering or other groupings are specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The above description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations were chosen in order to best explain the principles underlying the claims and their practical applications, to thereby enable others skilled in the art to best use the implementations with various modifications as are suited to the particular uses contemplated.

What is claimed is:

1. A method comprising:
    at a server having one or more processors and memory storing programs executed by the one or more processors,
        obtaining content items from a personal content collection of a user, wherein the content items include images and associated image information;
        analyzing the content items to identify attributes associated with the images, wherein the attributes include one or more of image data, image categories, and image groupings;
        generating rule sets based on the identified attributes to be used in determining one or more categories, groupings, and image relevance scores for a plurality of unclassified images of the user, wherein the generated rule sets include respective weights based on the one or more categories, groupings, and image relevance scores;
        applying the generated rule sets to the plurality of unclassified images to determine for each unclassified image of the plurality of unclassified images one or more categories, groupings, and image relevance scores;
        determining an aggregate relevance score for each unclassified image, wherein the aggregate relevance score is based on a respective subset of the generated rule sets applied to each unclassified image;
        identifying a first set of one or more of the unclassified images with determined aggregate relevance scores satisfying a predetermined relevance criteria, wherein the predetermined relevance criteria includes a respective threshold score for each of the image data, image categories, and image groupings of the content items from a personal content collection;
        determining respective categories and groupings for each image of the first set, the respective categories and groupings corresponding to image categories and image groupings of the content items in the personal content collection;
        storing each image of the first set in the personal content collection with a corresponding image category and image grouping in accordance with their respective categories and groupings;
        identifying a second set of one or more of the unclassified images with determined aggregate relevance scores below the predetermined relevance criteria; and
        placing the second set in a candidate list of the personal content collection, the candidate list including one or more candidate images to be reevaluated for storage in the personal content collection with a corresponding image category and image grouping.

2. The method of claim 1, further comprising notifying the user about the storage of the first set.

3. The method of claim 2, further comprising prompting the user for approval before storing the first set.

4. The method of claim 1, further comprising analyzing the content items to detect text within the images.

5. The method of claim 4, further comprising:
    recognizing fully or partially the text within the respective images;
    generating image search indexes with the fully or partially recognized text; and
    including the search indexes in the generated rule sets.

6. The method of claim 5, further comprising analyzing the plurality of unclassified images to detect text within the unclassified images.

7. The method of claim 6, further comprising:
    recognizing fully or partially the text within the unclassified images; and
    applying the generated rule sets to the plurality of unclassified images to determine for each unclassified image of the plurality of unclassified images one or more categories, groupings, and image relevance scores.

8. The method of claim 1, further comprising:
    periodically without user intervention monitoring the candidate list of the personal content collection;
    periodically without user intervention updating respective determined aggregate relevance scores of the one or more candidate images;
    identifying a third set of one or more unclassified image of the one or more candidate images with determined aggregate relevance scores satisfying the predetermined relevance criteria;
    determining respective categories and groupings for each image of the third set, the respective categories and groupings corresponding to image categories and image groupings of the content items in personal content collection; and
    storing each image of the third set in the personal content collection with a corresponding image category and image grouping in accordance with their respective categories and groupings.

9. The method of claim 1, further comprising updating the respective weights of the generated rule sets after associating each image of the first set with the content items and storing the first set.

10. The method of claim 8, further comprising updating the respective weights of the generated rule sets after associating each image of the third set with the content items and storing the third set.

11. The method of claim 1, wherein the associated image information includes text, keywords, user preferences, image content, URLs, location, time, forms, receipts, and handwritten notes.

12. The method of claim 1, further comprising displaying a user interface on a client device connected to the server, the user interface including a text entry pane for entering note information or a search query, a content collection displaying one or more category or grouping of images, the one or more category or grouping of images displaying one or more of content items, content item notes, or content attributes.

13. A server system, comprising:
one or more processors; and
memory storing one or more instructions that, when executed by the one or more processors, cause the computing system to perform operations including:
obtaining content items from a personal content collection of a user, wherein the content items include images and associated image information;
analyzing the content items to identify attributes associated with the images, wherein the attributes include one or more of image data, image categories, and image groupings;
generating rule sets based on the identified attributes to be used in determining one or more categories, groupings, and image relevance scores for a plurality of unclassified images of the user, wherein the generated rule sets include respective weights based on the one or more categories, groupings, and image relevance scores;
applying the generated rule sets to the plurality of unclassified images to determine for each unclassified image of the plurality of unclassified images one or more categories, groupings, and image relevance scores;
determining an aggregate relevance score for each unclassified image, wherein the aggregate relevance score is based on a respective subset of the generated rule sets applied to each unclassified image;
identifying a first set of one or more of the unclassified images with determined aggregate relevance scores satisfying a predetermined relevance criteria, wherein the predetermined relevance criteria includes a respective threshold score for each of the image data, image categories, and image groupings of the content items from a personal content collection;
determining respective categories and groupings for each image of the first set, the respective categories and groupings corresponding to image categories and image groupings of the content items in the grouping personal content collection;
storing each image of the first set in the personal content collection with a corresponding image category and image grouping in accordance with their respective categories and groupings;
identifying a second set of one or more of the unclassified images with determined aggregate relevance scores below the predetermined relevance criteria; and
placing the second set in a candidate list of the personal content collection, the candidate list including one or more candidate images to be reevaluated for storage in the personal content collection with a corresponding image category and image grouping.

14. The server system of claim 13, wherein the operations further comprise analyzing the content items to detect text within the images.

15. The server system of claim 14, wherein the operations further comprise:
recognizing fully or partially the text within the respective images;
generating image search indexes with the fully or partially recognized text; and
including the search indexes in the generated rule sets.

16. The server system of claim 13, wherein the operations further comprise:
periodically without user intervention monitoring the candidate list of the personal content collection;
periodically without user intervention updating respective determined aggregate relevance scores of the one or more candidate images;
identifying a third set of one or more unclassified image of the one or more candidate images with determined aggregate relevance scores satisfying the predetermined relevance criteria;
determining respective categories and groupings for each image of the third set, the respective categories and groupings corresponding to image categories and image groupings of the content items in the personal content collection; and
storing each image of the third set in the personal content collection with a corresponding image category and image grouping in accordance with their respective categories and groupings.

17. The server system of claim 13, wherein the operations further comprise displaying a user interface on a client device connected to the server, the user interface including a text entry pane for entering note information or a search query, a content collection displaying one or more category or grouping of images, the one or more category or grouping of images displaying one or more of content items, content item notes, or content attributes.

18. A non-transitory computer readable storage medium storing one or more programs configured for execution by a computer, the one or more programs comprising instructions for:
obtaining content items from a personal content collection of a user, wherein the content items include images and associated image information;
analyzing the content items to identify attributes associated with the images, wherein the attributes include one or more of image data, image categories, and image groupings;
generating rule sets based on the identified attributes to be used in determining one or more categories, groupings, and image relevance scores for a plurality of unclassified images of the user, wherein the generated rule sets include respective weights based on the one or more categories, groupings, and image relevance scores;
applying the generated rule sets to the plurality of unclassified images to determine for each unclassified image of the plurality of unclassified images one or more categories, groupings, and image relevance scores;

determining an aggregate relevance score for each unclassified image, wherein the aggregate relevance score is based on a respective subset of the generated rule sets applied to each unclassified image;

identifying a first set of one or more of the unclassified images with determined aggregate relevance scores satisfying a predetermined relevance criteria, wherein the predetermined relevance criteria includes a respective threshold score for each of the image data, image categories, and image groupings of the content items from a personal content collection;

determining respective categories and groupings for each image of the first set, the respective categories and groupings corresponding to image categories and image groupings of the content items in the personal content collection;

storing each image of the first set in the personal content collection with a corresponding image category and image grouping in accordance with their respective categories and groupings;

identifying a second set of one or more of the unclassified images with determined aggregate relevance scores below the predetermined relevance criteria; and placing the second set in a candidate list of the personal content collection, the candidate list including one or more candidate images to be reevaluated for storage in the personal content collection with a corresponding image category and image grouping.

* * * * *